United States Patent [19]

Kinoshita et al.

[11] Patent Number: 5,722,644
[45] Date of Patent: Mar. 3, 1998

[54] PRE-SHAPED VIBRATION-DAMPING MEMBER FOR DEFORMED PORTION

[75] Inventors: Ryouichi Kinoshita; Kingo Manabe, both of Fukuyama, Japan

[73] Assignee: Hayakawa Rubber Company Limited, Hiroshima, Japan

[21] Appl. No.: 713,184

[22] Filed: Sep. 12, 1996

[30] Foreign Application Priority Data

Sep. 12, 1995 [JP] Japan ................................. 7-233780

[51] Int. Cl.⁶ ............................................. F16F 15/04
[52] U.S. Cl. ......................... 267/141; 285/419; 181/207; 181/224
[58] Field of Search ............................ 267/136, 141, 267/141.7, 141.3, 153; 188/268; 285/47, 49, 53, 419; 181/198, 205, 207, 224, 227, 256, 257, 284, 286, 290, 403

[56] References Cited

U.S. PATENT DOCUMENTS

| | | | |
|---|---|---|---|
| 4,657,287 | 4/1987 | Nimke | 285/373 |
| 4,748,060 | 5/1988 | Fry et al. | 285/273 X |
| 4,783,300 | 11/1988 | Grunwell | 264/175 |
| 5,022,685 | 6/1991 | Stiskin et al. | 285/419 X |
| 5,135,267 | 8/1992 | Wilson | 285/419 X |
| 5,213,879 | 5/1993 | Niwa et al. | 428/213 |

*Primary Examiner*—Josie Ballato
*Attorney, Agent, or Firm*—Baker & Botts, L.L.P.

[57] ABSTRACT

A pre-shaped, self-adhesive vibration-damping member for a deformed portion includes a vibration-damping layer having a contact face that is adapted to be brought into contact with the deformed portion and is shaped in advance such that the contact face matches the shape of the deformed portion, an adhesive layer on the contact face of the vibration-damping layer, and a releasing film of a material that is releasable from the adhesive layer protectively covering the entire surface of the adhesive layer.

9 Claims, 2 Drawing Sheets

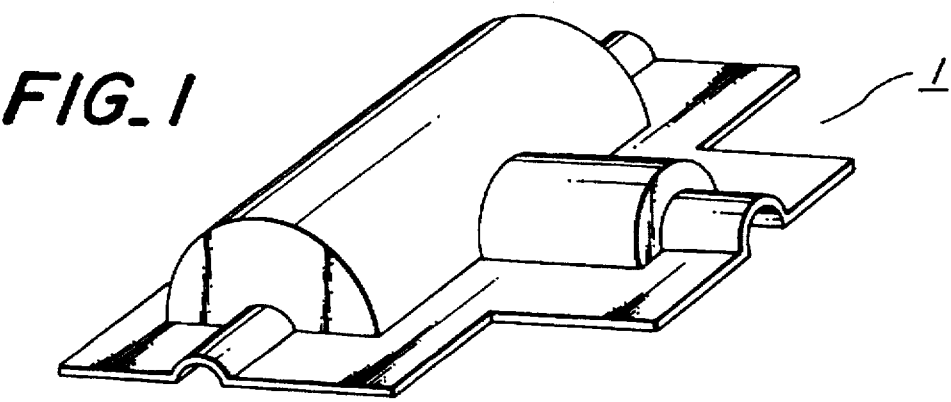
FIG_1
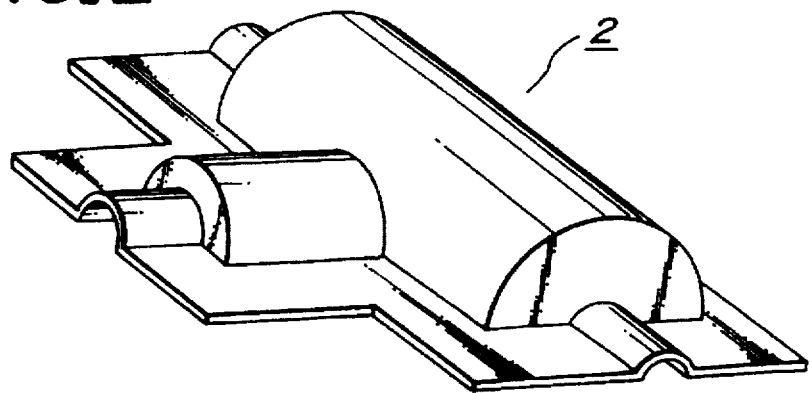
FIG_2
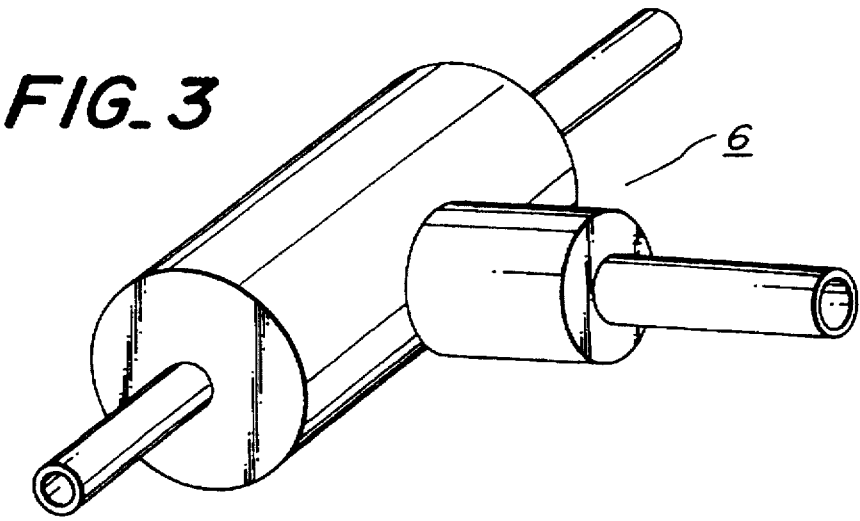
FIG_3

5,722,644

1

PRE-SHAPED VIBRATION-DAMPING MEMBER FOR DEFORMED PORTION

BACKGROUND OF THE INVENTION

1. Technical Field

This invention relates to a vibration-damping member used for a deformed portion of machine components, and more particularly to a pre-shaped, self-adhesive vibration-damping member for a deformed portion including such a contact face that is shaped in advance in order to fit the shape of a deformed portion to which the contact face is attached.

2. Background Art

Deformed portions of machine components such as pipe branch portions have generally been provided with vibration-damping materials. Conventional vibration-damping materials of this type are in the form of flexible plate, and subjected to manual expansion or contraction in order to fit the deformed portion to which they are attached and bonded before the actual use.

Since the conventional vibration-damping materials for deformed portions are in the form of plate-shaped flexible members which are applied to desired portions after manually expanding or contracting so that they fit the deformed portions to be applied to, application of the vibration-damping materials takes a rather long time. Further, the conventional vibration-damping member involves such a problem that the applied states of the vibration-damping member are different between workers who conducted the application, thereby resulting in poor workability and stability.

DISCLOSURE OF INVENTION

An object of the present invention is to solve the above-mentioned problems involved in the conventional vibration-damping members and to attain improved vibration-damping member having excellent workability and application stability.

The present invention has been reached through intense investigations for solving the above-mentioned problems. Consequently, the self-adhesive vibration-damping member for deformed portion according to the present invention includes a contact face which is shaped in advance in order to fit the shape of a deformed portion to which the contact face is attached and a releasing film having a thickness of 0.08–0.15 mm and protectively covering the entire surface of the contact face.

The other face of this vibration-damping member which does not come into contact with the deformed portion may preferably be protected by an outer shell member having a thickness of 0.03–0.13 mm.

Also, the specific gravity of this vibration-damping member may preferably be within the range of 1.6–2.8, and the adhesive strength of this vibration-damping member may be within the range of 0.5–2.0 Kg/25 mm in the preferred embodiments of the present invention.

Furthermore, the self-adhesive vibration-damping member according to the present invention may be composed of two or more parts to be combined into one at the time when the vibration-damping member is arranged to a desired portion, which parts respectively including such a contact face that is shaped in advance so as to fit the shape of a deformed portion to which the contact face is attached.

As materials usable for the self-adhesive vibration-damping member of the present invention, it may be preferable to use generally used natural rubber, styrene-

2 butadiene rubber, acrylonitrile-butadiene rubber, chloroprene rubber, butadiene rubber, ethylene-propylene rubber, acrylic rubber, epichlorohydrin rubber, butyl rubber, butyl regenerated rubber, tire regenerated rubber, ethylene vinyl acetate (EVA), atactic polypropylene, styrene-isoprene-styrene block copolymer (SIS), styrene-butadiene-styrene block copolymer (SEBS), and the like alone or in admixture. As compounds added to the above-mentioned base polymer, a filler such as calcium carbonate, clay, talc, zinc white, carbon black, white carbon, barium sulfate, iron powder, mica, gypsum, magnesium carbonate, cork; a softening agent such as liquid rubber, paraffinic, naphthenic, and aromatic petroleum softening agent; a tackifier such as phenolic resin, rosin and derivative thereof, polyterpene resin, coumarone-indene resin, petroleum resin, hydrogenated resin; and a pigment, antioxidant, modifier and the like are appropriately selected and used in the present invention. The resulting compounded composition is not restricted as long as it satisfies the specific gravity range of 1.6–2.8 as well as the adhesive strength range of 0.5–2.0 Kg/25 mm below.

In the vibration-damping member for deformed portion according to the present invention having the above-explained composition, since the self-adhesive contact face to be brought into contact with a deformed portion is shaped in advance so as to fit the deformed portion, it is not necessary to shape the vibration-damping member in accordance with the deformed portion at the time of application and the application can be easily completed by only pressing the vibration-damping member against the deformed portion. Also, since the contact face tightly adheres to the deformed portion due to its shape formed in accordance with the deformed portion, the vibration-damping member according to the present invention has excellent vibration damping properties and adhesion properties. In addition, since the entire surface of the contact face of the vibration-damping member for deformed portion according to the present invention is protectively covered by a releasing film, the vibration-damping member can be easily applied to a desired deformed portion by only removing the releasing film just before the application and pressing the contact face against the deformed portion. Accordingly, the vibration-damping member of this invention has improved Workability and much better vibration damping properties and adhesion properties when compared with conventional vibration-damping members.

Incidentally, when the vibration-damping member for deformed portion according to the present invention is composed of two or more divided parts, the workability is further improved since these parts can be integrated into one vibration-damping member at the time when the vibration-damping member is applied to a desired portion. In other words, when the vibration-damping member is intended to be applied to a narrow portion, the smaller divided parts make the application work much easier, thereby greatly improving the efficiency of the application work.

BRIEF DESCRIPTION OF DRAWINGS

The present invention will be explained in further detail with reference to the attached drawings.

FIG. 1 is a perspective view showing one of half-split parts of a pre-shaped vibration-damping member for pipe branch portion as one of the preferred embodiments of the pre-shaped vibration-damping member for deformed portion according to the present invention;

FIG. 2 is a perspective view showing the other half-split part of the pre-shaped vibration-damping member for pipe branch portion as one of the preferred embodiments of the pre-shaped vibration-damping member for deformed portion according to the present invention;

FIG. 3 is a perspective view illustrating a pipe branch portion to which the pre-shaped vibration-damping member shown in FIGS. 1 and 2 is applied;

DESCRIPTION OF THE PREFERRED EMBODIMENTS

The present invention will be hereinafter explained in further detail referring to the following embodiments.

Figure 4:
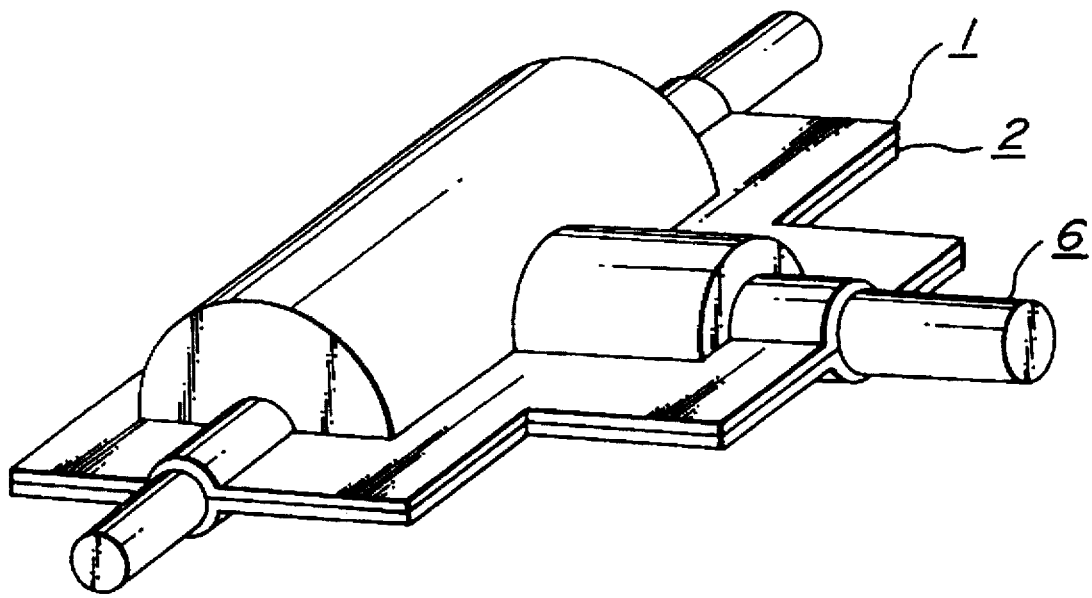
FIG. 4 is a perspective view depicting a state in which the pre-shaped vibration-damping member shown in FIGS. 1 and 2 is applied to the pipe branch portion.
Figure 5:
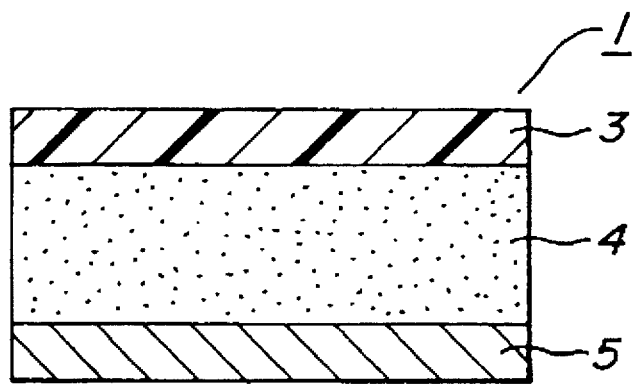
FIG. 5 is a cross-sectional view showing the pre-shaped vibration-damping member shown in FIGS. 1 and 2.

Referring to FIGS. 1 and 2, there is shown a pre-shaped vibration-damping member for pipe branch portion as one of the preferred embodiments of the present invention, and the drawings respectively illustrate one of half-split parts 1 and 2 of the pre-shaped vibration-damping member for pipe branch portion. Upon application to the pipe, the half-split parts 1 and 2 are combined with each other, thereby forming one integrated vibration-damping member. This type of pre-shaped vibration-damping member composed of two split parts 1 and 2 is used for preventing noise, vibration and the like of pipe branch portions. In FIG. 3, there is shown a pipe branch portion 6 which is to be protected by the pre-shaped vibration-damping member shown in FIGS. 1 and 2. Referring to FIG. 4, there is illustrated the pipe branch portion 6 which is covered with the half-split parts 1 and 2 of pre-shaped vibration-damping member for deformed portion. In FIG. 5, there is shown a cross section of the pre-shaped vibration-damping member shown in FIGS. 1 and 2. An outer shell member 3 serves for various purposes such as maintaining the outer shape of the pre-shaped vibration-damping member for deformed portion according to the present invention, reinforcing the portion to which the vibration-damping member is applied, preventing oxidation of the vibration-damping member and the like. As the vibration-damping material 4, various materials can be used as long as they are self-adhesive and such materials have been mentioned above. The reference numeral 5 denotes a releasing film.

Next, explanations will be given on results of comparative experiments in which materials for each component of the vibration-damping member and/or the components themselves are varied with respect to the pre-shaped vibration-damping member for deformed portion shown in FIGS. 1 and 2 as one of the preferred embodiments of the present invention.

Vibration-damping materials used in the experiments respectively have such a compound ratio and material properties as shown in Table 1.

Blending of compound A will be explained below by way of example for blending of the vibration-damping material 4. In experimental example A as a vibration-damping material, 252 g of butyl regenerated rubber (manufactured by Hayakawa Rubber Co., Ltd.), 840 g of calcium carbonate (manufactured by Takehara Kagaku Co., Ltd.), 94 g of ARKON P-100 (manufactured by Arakawa Kagaku Co., Ltd.), 22 g of Polybutene HV-100 (manufactured by NOF Corporation), and 30 g of paraffin oil (manufactured by Idemitsu Petrochemical Co., Ltd.) were kneaded at 110° C. for 10 minutes in a pressure kneader having a capacity of 1000 cc, thereby obtaining the compound A. Compounds B–H were obtained in the same manner.

Then, 70 cc of each of the thus-obtained compounds was sandwiched between releasing sheets and pressed to the thickness of 2 mm with use of a press machine while avoiding inclusion of air. As a result, there was attained a vibration-damping sheet having a thickness of 2 mm. After removing the releasing sheets from the vibration-damping sheet, the vibration-damping sheet was sandwiched between the outer shell member 3 and a releasing surface of the releasing film 5 while avoiding inclusion of air, thereby obtaining a test piece.

This sample master was shaped by vacuum molding from the side of releasing film 5 so that it corresponds to the contour of the pipe branch portion to which it is applied. Then, the marginal portion of the master was trimmed away from the molded vibration-damping member accompanied by an overlap width. In this manner, there have been obtained two parts of the molded vibration-damping member respectively having a structure shown in FIG. 1 or 2.

Molded vibration-damping members B–H were obtained in the same manner.

Compounds of vibration-damping materials A–H and their properties are shown in Table 1. Experimental results of embodiments 1–5 of the present invention are shown in Table 2, and those of comparative examples and conventional vibration-damping member are shown in Table 3.

The specific gravity of each vibration-damping member was measured by underwater suspension method according to JIS K 6350.

Measurement of the peeling strength of each vibration-damping member was conducted by bonding the test piece, which had been cut to have a width of 25 mm, to a degreased copper plate, rolling a rubber roller of 2 Kg thereon twice in double-stroke, and then subjecting the bounded test piece and copper plate to 180° peeling-off at 300 mm/min.

TABLE 1

|  | A | B | C | D | E | F | G | H |
|---|---|---|---|---|---|---|---|---|
| (1) Butyl regenerated rubber | 100 | 100 | 100 | 100 | 100 | 100 | 100 | 100 |
| (2) Calcium carbonate | 330 | — | 140 | 150 | 35 | 140 | — | 240 |
| (3) Barium sulfate | — | 930 | 730 | 200 | 680 | 560 | 940 | — |
| (4) Zinc white | — | 150 | 210 | — | 285 | 285 | 200 | — |
| (5) Petroleum resin | 37 | 19 | 18 | 37 | 19 | 19 | 13 | 37 |
| (6) Polybutene | 9 | 83 | 40 | 25 | 51 | 49 | 67 | 14 |
| (7) Paraffin oil | 12 | 10 | 33 | 12 | 34 | 34 | 17 | 12 |
| Total | 488 | 1292 | 1271 | 524 | 1204 | 1187 | 1337 | 403 |
| Specific gravity | 1.7 | 2.7 | 2.8 | 1.9 | 2.6 | 2.6 | 2.9 | 1.5 |
| Peel strength | 0.8 | 1.9 | 0.5 | 1.4 | 0.7 | 0.3 | 0.3 | 2.2 |

TABLE 2

|  | Embodiments | | | | |
|---|---|---|---|---|---|
|  | 1 | 2 | 3 | 4 | 5 |
| Form | Molded | Molded | Molded | Molded | Molded |
| Compound type of vibration-damping material | A | B | C | D | E |
| Specific gravity | 1.7 | 2.7 | 2.8 | 1.9 | 2.6 |
| Peeling strength | 0.8 | 1.9 | 0.5 | 1.4 | 0.7 |
| Thickness of protective film(mm) | 0.030 | 0.080 | 0.080 | 0.120 | 0.080 |
| Thickness of releasing | 0.125 | 0.080 | 0.125 | 0.125 | 0.150 |

TABLE 2-continued

|  | Embodiments | | | | |
|---|---|---|---|---|---|
|  | 1 | 2 | 3 | 4 | 5 |
| film(mm) |  |  |  |  |  |
| Workability (sec) | 32 | 39 | 29 | 36 | 35 |
| Bonding reliability | ○ | ○ | ○ | ○ | ○ |
| Cost | ○ | ○ | ○ | ○ | ○ |
| Releasing film separation property | ○ | ○ | ○ | ○ | ○ |
| Shape-preservation property of molded member | ○ | ○ | ○ | ◉ | ◉ |
| Vibration-damping property | ○○ | ○ | ○ | ○ |  |
| Total Evaluation | ○○ | ○ | ○ | ○ |  |

◉, slightly deformed but applicable without any trouble: ○, greatly deformed and cannot be applied without trouble: x.

5. Vibration-damping property

A vibrator provided with an impedance head was arranged to the pipe branch portion and loss factor of each vibration-damping member (converted to a value at 20° C., 500 Hz) was measured, and those vibration-damping members having a loss factor not less than 0.1 were indicated by ○, and those vibration-damping members having a loss factor less than 0.1 were indicated by x.

As clear from comparative examples 4 and 5, when the specific gravity is less than 1.6, the vibration-damping member cannot have a sufficient vibration-damping property. On the other hand, when the specific gravity is more than 2.8, it cannot be satisfied from the view point of cost. Further, as seen from comparative examples 1 and 5, when

TABLE 3

|  | Embodiments | | | | | Conventional member |
|---|---|---|---|---|---|---|
|  | 1 | 2 | 3 | 4 | 5 | 1 |
| Form | Molded | Molded | Molded | Molded | Molded | Plate |
| Compound type of vibration-damping material | F | E | E | G | H | E |
| Specific gravity | 2.6 | 2.6 | 2.6 | 2.9 | 1.5 | 26 |
| Peeling strength | 0.3 | 0.7 | 0.7 | 0.3 | 2.1 | 0.7 |
| Thickness of protective film(mm) | 0.080 | 0.025 | 0.145 | 0.080 | 0.080 | 0.080 |
| Thickness of releasing film (mm) | 0.070 | 0.170 | 0.125 | 0.125 | 0.125 | 0.125 |
| Workability (sec) | 26 | 28 | 33 | 28 | 68 | 174 |
| Bonding reliability | x | ○ | ○ | ○ | ○ | x |
| Cost | ○ | x | x | x | ○ | ○ |
| Releasing film separation property | x | ◉ | ○ | ◉ | ○ | ◉ |
| Shape-preservation property of molded member | ○ | x | ◉ | ○ | ○ | — |
| Vibration-damping property | ○ | ○ | ○ | ○ | x | α |
| Total Evaluation | x | x | x | x | x | x |

Each experiment was conducted as follows:

1. Workability

A branch portion of copper pipe was surrounded by wall with a space of 10 mm, and each vibration-damping member was applied to such branch portion. Length of working time taken for each application was measured.

2. Bonding reliability

Each vibration-damping member applied to the branch portion in the above workability experiment was subjected to five heat cycles of heating at 100° C. for 2 hours and cooling at −20° C. for 2 hours. After this heat cycling, those vibration-damping members coming incomplete bonding or separation were indicated by x, and those vibration-damping members free from such incomplete bonding or separation were indicated by ○.

3. Releasing film separation property

Releasing film separation property during the workability experiment was evaluated as follows. Excellent: ◉, good: ○, not good: △, bad: x.

4. Shape-preservation property of molded member

Twenty of each molded vibration-damping member were piled up and left in a constant temperature oven at 50° C. for 24 hours, and then shape of one placed in the bottom was evaluated as follows. Scarcely deformed:

the adhesive strength of the vibration-damping member is less than 0.5 Kg/25 mm, application reliability is poor. However, when the adhesive strength is more than 2.0 Kg/25 mm, the vibration-damping member is immediately fixed to a deformed portion at any place with which it is first brought into contact, and this greatly deteriorates the workability of the vibration-damping member.

Preferable thickness for the releasing film protectively covering the entire surface of the contact face which is to be brought into contact with a deformed portion is 0.08–0.15 mm. As seen in comparative examples 1 and 2, when the thickness of the releasing film is less than 0.08 mm, releasing film separation property during use is poor, and having a thickness more than 0.15 mm involves problems in the aspect of cost.

Preferable thickness for the shell member protectively covering the other face of the vibration-damping member which does not come into contact with the deformed portion is 0.03–0.13 mm. From comparative examples 1 and 2, it is clearly understood that when the thickness of the outer shell member is less than 0.03 mm, the shape-preservation property of the molded vibration-damping member is not sufficient, and that when the thickness of the shell member is more than 0.13 mm, there remains a problem in the aspect of cost.

As described above, the pre-shaped vibration-damping member for the pipe branch portion according to the present invention is remarkably improved in workability as well as stability when compared with conventional vibration-damping member in the form of flexible plate. Therefore, the pre-shaped vibration-damping member for deformed portion according to the present invention has a great utility value in industrial fields.

Although the invention has been described with reference to a molded member for the pipe branch portion as one of the preferred embodiments, it is given by way of examples in order to clearly show differences in performance. Accordingly, it should be noted that various changes and modifications may be made thereon without departing from the scope of the present invention as defined by the appended claims and thus, the present invention can be applicable as a vibration-damping member for deformed portion of various machine components.

Furthermore, the base polymer for the compound is not restricted to the above-described butyl regenerated rubber, and various materials mentioned before can be used for the present invention.

As described above, the vibration-damping member for deformed portion according to the present invention can be easily applied to a desired deformed portion by only removing the releasing film just before the application and pressing the contact face against the deformed portion. Therefore, it can be said that the vibration-damping member for deformed portion according to the present invention has been significantly improved in workability, vibration damping property and adhesive property when compared with conventional vibration-damping member of this type. When the vibration-damping member for deformed portion according to the present invention is used in place of the conventional vibration-damping member, which is in the form of flexible plate and should be subjected to manual expansion or contraction in order to fit the deformed portion to which it is applied before the actual use, it can exhibit an excellent performance as a vibration-damping member for deformed portion of various machine components due to its advantages in workability, vibration damping property and adhesive property. Consequently, it can be understood that the vibration-damping member for deformed portion according to the present invention has a very high utility value in various industrial fields.

What is claimed is:

1. A pre-shaped, self-adhesive vibration-damping member for a deformed portion comprising:

a vibration-damping layer having a contact face adapted to be brought into contact with the deformed portion and an outer face on the side of the vibration-damping layer opposite from the contact face, the vibration-damping layer being shaped in advance such that the contact face matches the shape of the deformed portion, an adhesive layer on the contact face of the vibration-damping layer, and a releasing film of a material that is releasable from the adhesive layer protectively covering the entire surface of the adhesive layer.

2. The vibration-damping member as set forth in claim 1 and further comprising an outer shell member having a thickness of 0.03 mm to 0.13 mm protectively covering the outer face of the vibration-damping layer.

3. The vibration-damping member as set forth in claim 2, wherein the vibration-damping layer has a specific gravity within the range of 1.6 to 2.8.

4. The vibration-damping member as set forth in claim 2, wherein the adhesive layer has an adhesive strength within the range of 0.5 kg/25 mm to 2.0 Kg/25 mm.

5. The vibration-damping member as set forth in claim 1, wherein the vibration-damping layer has a specific gravity within the range of 1.6 to 2.8.

6. The vibration-damping member as set forth in claim 5, wherein the adhesive layer has an adhesive strength within the range of 0.5 kg/25 mm to 2.0 Kg/25 mm.

7. The vibration-damping member as set forth in claim 1, wherein the adhesive layer has an adhesive strength within the range of 0.5 kg/25 mm to 2.0 Kg/25 mm.

8. A pre-shaped, self-adhesive vibration-damping member for a deformed portion comprising two or more parts, each of which parts includes a vibration damping layer having a contact face adapted to be brought into contact with a part of the deformed portion and is shaped in advance such that the contact face matches the shape of said part of the deformed portion.

9. The vibration-damping member as set forth in claim 8, wherein each part of said vibration-damping member includes an adhesive layer on the contact face of the vibration-damping layer, and a releasing film of a material that is releasable from the adhesive layer protectively covering the entire surface of the adhesive layer.

* * * * *

UNITED STATES PATENT AND TRADEMARK OFFICE
CERTIFICATE OF CORRECTION

PATENT NO. : 5,722,644

DATED : March 3, 1998

INVENTOR(S) : Kinoshita et al.

It is certified that error appears in the above-identified patent and that said Letters Patent is hereby corrected as shown below:

penultimate line of ABSTRACT, "coveting" should read --covering--;

Column 2, bridging lines 20-21, "mm below" should read --mm.--;

Column 2, line 43, "Workabil-" should read --workabil- --;

Column 5, lines 10-16, should read

| | | | | | |
|---|---|---|---|---|---|
| Releasing film separation property | ○ | ○ | ○ | ○ | ◎ |
| Shape-preservation property of molded member | ○ | ○ | ◎ | ◎ | ◎ |
| Vibration-damping property | ○ | ○ | ○ | ○ | ○ |
| Total Evaluation | ○ | ○ | ○ | ○ | ○ |

UNITED STATES PATENT AND TRADEMARK OFFICE
CERTIFICATE OF CORRECTION

PATENT NO. : 5,722,644

DATED : March 3, 1998

INVENTOR(S) : Kinoshita et al.

It is certified that error appears in the above-identified patent and that said Letters Patent is hereby corrected as shown below:

Column 5, penultimate line of Table 3, "∝" should read --○--;

Column 8, line 11, "coveting" should read --covering--.

Signed and Sealed this

Eighth Day of June, 1999

*Attest:*

Q. TODD DICKINSON

*Attesting Officer*   *Acting Commissioner of Patents and Trademarks*